United States Patent [19]

Okawa et al.

[11] Patent Number: 4,655,734
[45] Date of Patent: Apr. 7, 1987

[54] ENDLESS BELT FOR POWER TRANSMISSION

[75] Inventors: Susumu Okawa, Numazu; Yasunobu Jufuku; Shigeru Okuwaki, both of Susono; Takayoshi Kondou, Nagoya; Toshiya Endo, Aichi; Shigenori Nakata, Kariya, all of Japan

[73] Assignee: Toyota Jidosha Kabushiki Kaisha, Aichi, Japan

[21] Appl. No.: 750,286

[22] Filed: Jul. 1, 1985

[30] Foreign Application Priority Data

Jul. 4, 1984 [JP] Japan .................. 59-138552

[51] Int. Cl.$^4$ .................................. F16G 1/22
[52] U.S. Cl. ........................ 474/242; 474/267
[58] Field of Search ........... 474/242, 241, 201, 265, 474/266, 267

[56] References Cited

U.S. PATENT DOCUMENTS

| | | | |
|---|---|---|---|
| 841,154 | 1/1907 | Kast | 474/267 X |
| 1,499,314 | 6/1924 | Cobb | 474/267 X |
| 1,573,559 | 2/1926 | Manley | 474/267 |
| 4,552,548 | 11/1985 | Hattori | 474/201 |
| 4,552,549 | 11/1985 | Hattori | 474/242 X |
| 4,552,550 | 11/1985 | Howerton | 474/242 |

Primary Examiner—Stephen J. Novosad
Assistant Examiner—Thuy M. Bui
Attorney, Agent, or Firm—Parkhurst & Oliff

[57] ABSTRACT

An endless belt for the power transmission, wherein a plurality of block bodies each comprising a body member formed of a highly rigid material and provided at opposite side portions thereof with inclined surfaces being in frictional engagement with pulleys and a clamp member formed separately of said body member are arranged in a row and adjacent to one another on a belt-shaped endless carrier formed of fabric in such a manner that the endless carrier is clamped between the body members and the clamp members, the endless belt being of such an arrangement that the belt-shaped endless carrier formed of fabric is woven by warps disposed in the longitudinal direction and wefts disposed in the widthwise direction, with the wefts restraining the warps.

6 Claims, 16 Drawing Figures

ENDLESS BELT FOR POWER TRANSMISSION

BACKGROUND OF THE INVENTION

1. Field of the Invention

This invention relates to an endless belt for the power transmission, and more particularly to an endless belt for the power transmission used in a belt type continuously variable transmission system.

2. Description of the Prior Art

Recently, there has been proposed a belt type continuously variable transmission system as a transmission system for vehicle such as motor vehicles.

The belt type continuously variable transmission system which has heretofore been proposed is of such an arrangement that one rotary shaft and the other rotary shaft are each provided thereon with a pulley having a circumferential groove being of a V-shape in cross section, and an endless belt for the power transmission is racked across these pulleys. The widths of the circumferential grooves being of the V-shape in cross seciton of the pulleys are varied, whereby a rotational driving force from one rotary shaft to the other is continuously variedly transmitted.

As the endless belt for the power transmission used in the belt type continuously variable transmission system of this type, there is one in which a plurality of block bodies each comprising a body member formed of a highly rigid material and provided at opposite side portions thereof with inclined surfaces being in frictional engagement with the pulleys and a clamp member formed separately of the body member are arranged in a row and adjacent to one another on a belt-shaped endless carrier formed of fabric in such a manner that the endless carrier is clamped between the body members and the clamp members (Japanese Utility Model Applicaiton No. 187081/1983).

As the endless carrier used in the endless belt for the power transmission of this type, there is one in which filaments are disposed in the longitudinal direction by the techniques of a filament winding method and the like and filaments are enveloped by a rubber-like material (U.S. Pat. No. 2,638,007).

However, when the endless carrier is formed only of filaments disposed in the longitudinal direction, even if the filaments of the endless carrier are enveloped by the rubber-like material, the endless carrier may be cracked in the longitudinal direction due to a high tensile load applied thereto during the power transmission, use for a long period of time and the like. In other words, such a problem is presented that a so-called slitting phenomenon is caused.

The problem to be solved by the present invention is to avoid occurrence of the slitting phenomenon in the endless carrier.

SUMMARY OF THE INVENTION

The present invention contemplates to solve the above-described problem by restraining the movements of warps disposed in the longitudinal direction by use of wefts disposed in the widthwise (lateral) direction.

More specifically, according to the present invention, in the above-described endless belt for the power transmission of this type, the belt-shaped endless carrier formed of fabric is woven by the warps disposed in the longitudinal direction and the wefts disposed in the widthwise direction, so that such a measure is taken that the endless carrier is woven with the wefts restraining the warps.

To this end, the present invention contemplates that an endless belt for the power transmission, wherein a plurality of block bodies each comprising a body member formed of a highly rigid material and provided at opposite side portions thereof with inclined surfaces being in frictional engagement with pulleys and a clamp member formed separately of said body member are arranged in a row and adjacent to one another on a belt-shaped endless carrier formed of fabric in such a manner that said endless carrier is clamped between said body members and said clamp members, said belt-shaped endless carrier formed of fabric is woven by warps disposed in the longitudinal direction and wefts disposed in the widthwise direction, with said wefts restraning said warps.

According to the above-described measure, when the warps disposed in the longitudinal direction tend to move in the widthwise (lateral) direction, the warps are prevented from moving by the wefts disposed in the widthwise direction.

To the above end, the present invention contemplates that one weft is spirally wound around the warps.

To the above end, the present invention contemplates that the body member is formed at the central portion thereof with a clamp recess for receiving the endless carrier and at opposite side portions thereof with said inclined surfaces being in frictional engagement with the circumferential groove of the pulley.

To the above end, the present invention contemplates that the clamp member is constituted by a bar and a plate, the plate is bent doubly, the bar is clamped between the doubly bent portions, and the bar and the plate and the integrally connected to each other, the body member has block posts erected from opposite sides thereof, block post insertion holes are formed in the plate at opposite sides of the bar in the clamp member, the block posts are inserted into the block post insertion holes, and, the opposite side portion of the plate are subjected to stakings in a state where the endless carrier is clamped between the body member and the clamp member.

To the above end, the present invention contemplates that the undersurfaces on opposite sides of the front surface of the plate are slightly lower than the undersurface of the bar clamping the endless carrier under pressure, and, in the assembled state the undersurfaces are at the substantially same position as a center line of the endless carrier in the thicknesswise direction thereof.

To the above end, the present invention contemplates that a contact surface portion of the block body is formed such that it comes into contact with rear surfaces of the plate of another block body, to which the front surface of the plate is adjacent, and the body member, the inner end of the contact surface portion is formed by the undersurface of the plate and a gap corresponding to the plate thickness of the plate is provided in the block body and inwardly of the endless carrier, whereby, when the endless belt for the power transmission moves, being guided around the pulleys, the block bodies move, being rockingly rotated about the inner ends of the contact surface portion as being the fulcrums.

BRIEF DESCRIPTION OF THE DRAWINGS

FIG. 8 is a plan view showing the state where the terminating ends of the warps are treated;

FIG. 9 (a) shows the state where the rubber-like material or the like is applied to the one of the surfaces of the endless carrier, FIG. 9 (b) shows the state where the rubber-like material or the like applied to the both surfaces;

FIGS. 12 and 13 show other examples where the endless carrier is formed into endless shapes, FIG. 12 showing the pad method, FIG. 12 (a) being a side view and FIG. 12 (b) being a plan view, and FIG. 13 showing the overlap method, FIG. 13 (a) being a side view and FIG. 13 (b) being a plan view.

DESCRIPTION OF THE PREFERRED EMBODIMENT

Description will hereunder be given of the embodiments of the present invention with reference to the drawings.

Figure 3:
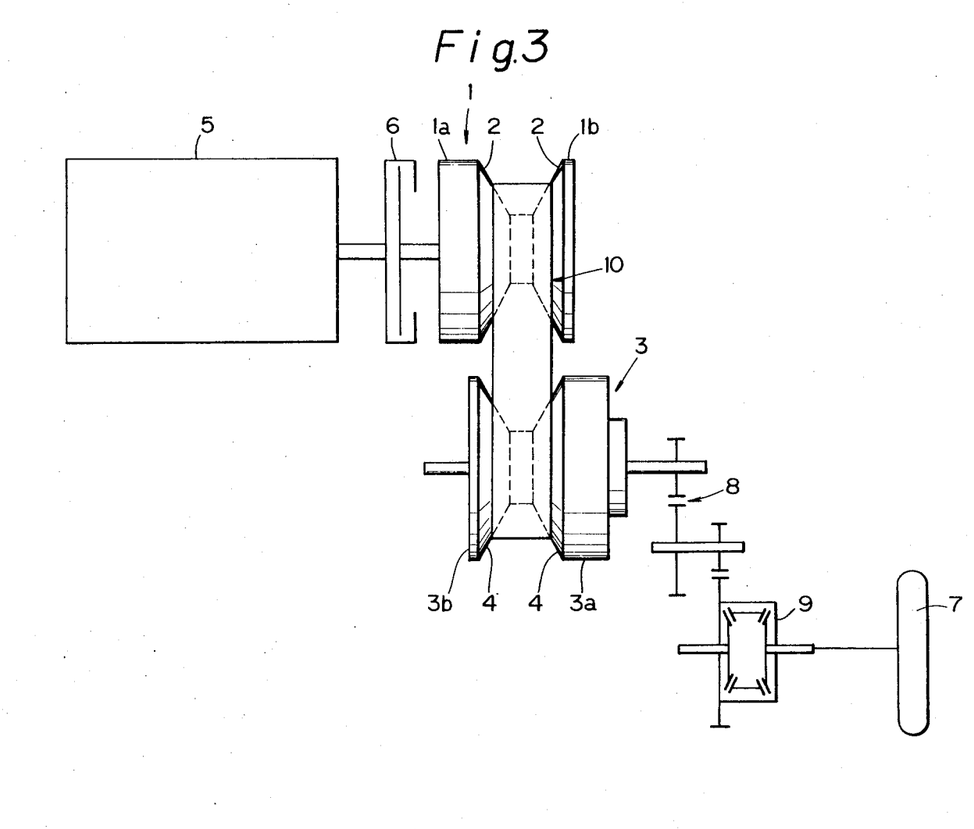
FIG. 3 is schematic view showing an example of the continuously variable transmission system to which is applied the endless belt for the power transmission according to the present invention.

FIG. 3 is schematic view generally showing one example of the continuously variable transmission system to which is applied the endless belt for the power transmission according to the present invention.

Explanation will be given of FIG. 3. Connected to a driving source 5 such as an engine is a clutch 6, to which is connected an input pulley 1. The input pulley 1 is constituted by a movable pulley 1a and a stationary pulley 1b. The both pulleys 1a and 1b are formed with pulley surfaces 2 and 2, respectively. These pulley surfaces 2 and 2 are driving surfaces of the pulleys 1a and 1b, respectively, whereby the pulley 1 is formed with a circumferential groove being of a V-shape in cross section.

An output pulley 3 is provided in line with the input pulley 1. This output pulley 3 is also constituted by a movable pulley 3a and a stationally pulley 3b. Similarly to the case of the input pulley 1, the both pulleys 3a and 3b are formed with pulley surfaces 4 and 4, respectively. These pulley surfaces 4 and 4 are driven surfaces of the both pulleys 3a and 3b, respectively, whereby the pulley 3 is formed with a circumferential groove being of a V-shape in cross section.

Then, an endless belt 10 for the power transmission is racked across the circumferential groove being of a V-shape in cross section formed by the pulley surfaces 2 and 2 of the input pulley 1 and the circumferential groove bing of a V-shape in cross section formed by the pulley surfaces 4 and 4 of the output pulley 3, so that a rotational driving force can be imparted from the input pulley 1 to the output pulley 3.

Additionally, in each of the movable pulley 1a of the input pulley 1 and the movable pulley 3b of the output pulley 3, the width of the circumferential groove being of a V-shape in cross section can be varied by means of hydraulic pressure or the like. The width of these circumferential grooves are adapted to be continuously varied, so that rotation of the output pulley 3 can be continuously varied and taken off.

As described above, the continuously variable transmission system shown in FIG. 3 is formed by a combination between the input pulley 1 and the output pulley 3, across which pulleys is racked the endless belt 10 for the power transmission, whereby the rotational driving force from the driving source 5 is imparted through the clutch 6 to the continuously variable transmission system, where the rotational driving force is changed in speed and taken off. The rotational driving force thus taken off is imparted through a pair of reduction gears 8 to a differential 9 and further transmitted to wheels 7 for driving a vehicle.

Figure 4:
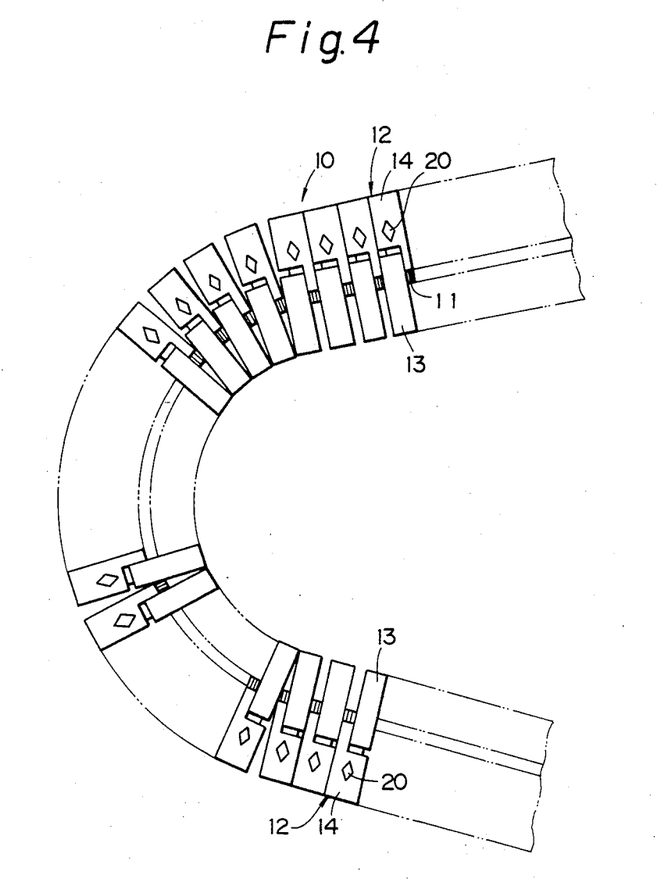
FIG. 4 is a side view showing the state where the endless belt for the power transmission is racked across the pulleys.

FIG. 4 is a side view showing the extraction of the state where the endless belt 10 for the power transmission is guided around the input pulley 1 or the output pulley 3 as shown in FIG. 3. As apparent from this drawing, block bodies 12 for the power transmission are arranged in a row and adjacent to one another on the endless carrier 11 and mounted thereto.

Figure 5:
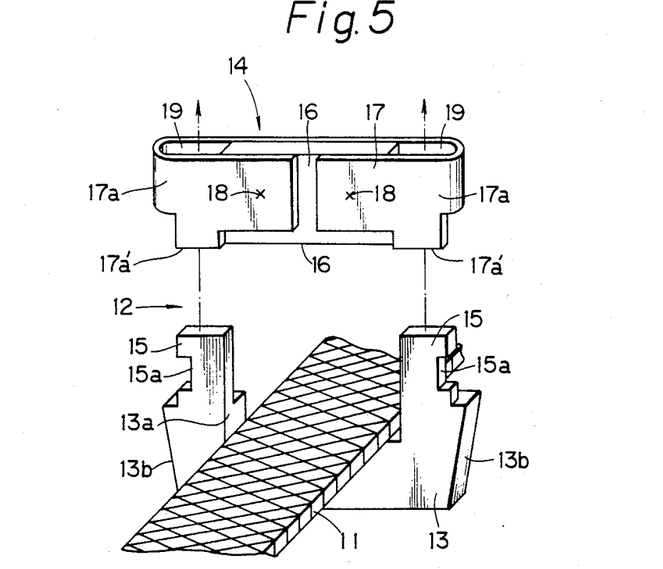
FIG. 5 is disassembled perspective view showing the state where a block body is mounted to the endless carrier.
Figure 6:
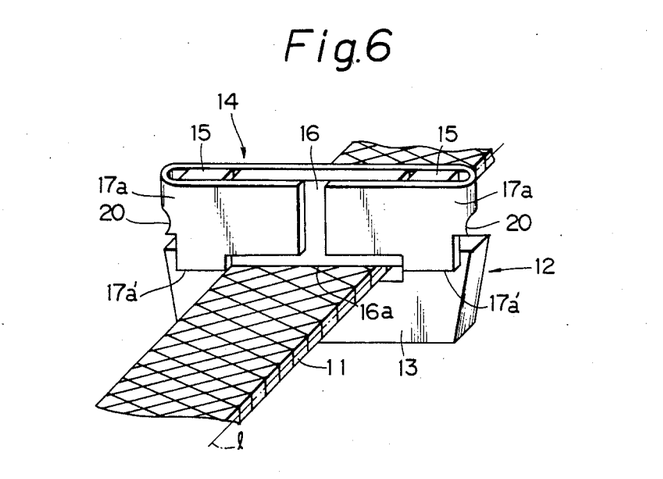
FIG. 6 is an assembled perspective view thereof.

FIGS. 5 and 6 show the state where one block body 12 is mounted to the endless carrier 11, FIG. 5 being the disassembled perspective view and FIG. 6 being the assembled perspective view.

The endless carrier 11 is formed of the fabric of polyamide fibers. In order for this endless carrier 11 to perform the power transmission smoothly and accurately, it is preferable that this endless carrier 11 is as low as possible in elongation to the tensile load applied thereto during the power transmission.

The block body 12 is constituted by a body member 13 and a clamp member 14. The body member 13 is formed at the central portion thereof with a clamp recess 13a for receiving the endless carrier 11 and at opposite side portions thereof with inclined surfaces 13b and 13b being in frictional engagement with the circumferential groove of the pulley. Furthermore, the body member 13 has block posts 15 and 15 erected from opposite sides thereof. Each of these block posts 15 is provided with a recess 15a for staking. Additionally, the body member 13 is formed of a material having a high rigidity such as metal, ceramics or resin.

The clamp member 14 is constituted by a bar 16 and a plate 17. The plate 17 is bent doubly, the bar 16 is clamped between the doubly bent portions, and the bar 16 and the plate 17 and the integrally connected to each other by weldings 18 and 18. Additionally, this connection may be made by use of a bonding agent or the like. Block post insertion holes 19 and 19 are formed in the plate 17 at opposite sides of the bar 16 in the clamp member 14, the block posts 15 and 15 are inserted into these block post insertion holes 19 and 19, and, as shown in FIG. 6, the opposite side portion of the plate 17 are subjected to stakings 20 and 20 in a state where endless carrier 11 is clamped between the body member 13 and the clamp member 14, whereby the body member 13 is made integral with the clamp member 14. Additionally, the stakings 20 and 20 are carried out such that the opposite side portions of the plate 17 are engaged with the recesses 15a and 15a for the staking, which are formed on the block posts 15 and 15, so that the body member 13 and the clamp member 14 can be firmly connected to be integral.

Furthermore, in the state where the bar 16 and the plate 17 in the clamp member 14 are made integral by the weldings 18 and 18, the undersurfaces 17a' and 17a' on opposite sides of the front surface 17a of the plate 17 are slightly lower than the undersurface 16a of the bar 16 clamping the endless carrier 11 under pressure, and, in the assembled state as shown in FIG. 6, the undersurfaces 17a' and 17a' are at the substantially same position as a center line l of the endless carrier 11 in the thicknesswise direction thereof.

Figure 7:
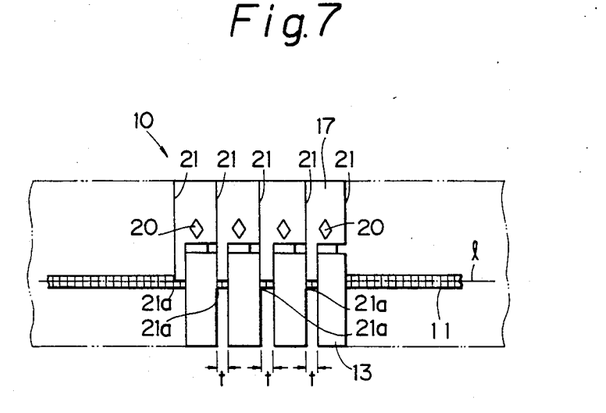
FIG. 7 is a side view showing the state where the block bodies are arranged in a row.

FIG. 7 shows the state where the block bodies 12 clamplingly supported by the endless carrier 11 as described above are arranged in a row and adjacent to one another. As apparent from this drawing, the block bodies 12 arranged adjacent to one another are brought at contact surface portions 21 thereof outwardly (upwardly in FIG. 7) of the endless carrier 11 into contact with one another and in a row. Additionally, the contact surface portion 21 of the block body 12 is formed such that it comes into contact with rear surfaces of the plate 17 of another block body 12, to which the front surface 17a of the plate 17 is adjacent, and the body member 13. The inner end 21a of the contact surface portion 21 is formed by the undersurface 17a' of the plate 17 and at the substantially same position as the center line l of the endless carrier 11 in the thicknesswise direciton thereof.

Furthermore, as apparent from FIG. 7, a gap t corresponding to the plate thickness of the plate 17 is provided in the block body 12 and inwardly of the endless carrier 11, whereby, when the endless belt 10 for the power transmission moves, being guided around the pulleys, as shown in FIG. 4, the block bodies 12 move, being rockingly rotated about the inner ends 21a of the contact surface portion 21 as being the fulcrums.

With the above-described arrangement, when the endless belt 10 for the power transmission is guided around the pulleys and moved, the power is transmitted such that the endless belt 10 is brought into frictional contact with the inclined surfaces 13b and 13b of the body members 13 each formed of the highly rigid material, which constitutes the block body 12, so that no buckling deformation occurs due to the aforesaid frictionally engaging force, thus enabling to transmit a high rotational driving force.

Furthermore, the endless carrier 11 supporting the block bodies 12 in a row is formed of fabric, which is high in flexibility, and moreover, only the tensile force is applied to the endless carrier 11, so that the endless carrier 11 can be formed to be relatively thin and a low minimum radius of curvature can be obtained. As the result, the range of transmission gear ratio of the belt type continuously variable transmission system can be widened.

Furthermore, when the endless belt 10 for the power transmission is guided around the pulleys and moved, the block bodies 12 are rockingly rotated about the inner ends 21a of the contact surface portion 21 substantially coinciding with the position of the center line l of the endless carrier 11 in the thicknesswise direction thereof. In consequence, there is little extension or shrinkage of the endless carrier 11. To be accurate, the endless carrier 11 slightly extends upwardly of its center line l and slightly shrinks downwardly of its center line l, so that the curved deformation of the endless carrier 11 along the pulleys can be performed smoothly.

Furthermore, the integral connection between the body member 13 and the clamp member 14 in the block body 12 is carried out by the stakings 20 and 20, so that the thickness of the block body 12 in the direction of the rotational power transmission can be decreased. As the result, with this arrangement, the minimum radius of curvature of the endless belt 10 for the power transmission can be reduced and the contact area between the block body 12 and the pulley can be increased. In consequence, the range of transmission gear ratio can be widened and the imparted torque can be raised as compared with the conventional rubber belt.

Furthermore, the block body 12 is fixedly mounted to the endless carrier 11 by clamping, whereby there is not caused frictional loss, which would be caused in the case of slidable mounting as in Japanese Patent Application Publication No. 6783/1980 entiteled "Flexible continuous transmission system" for example, moreover, the transmission efficiency is high and the assembling properties are satisfactory.

Additionally, as the mounting construction for mounting the block body 12 constituted by the body member 13 and the clamp member 14 to the endless carrier 11 formed of fabric, there may be thought of various other mounting constructions in addition to the mounting construction by the staking as in the above-described embodiment.

Detailed description will hereunder be given of the endless carrier 11 formed of fabric.

Figure 1:
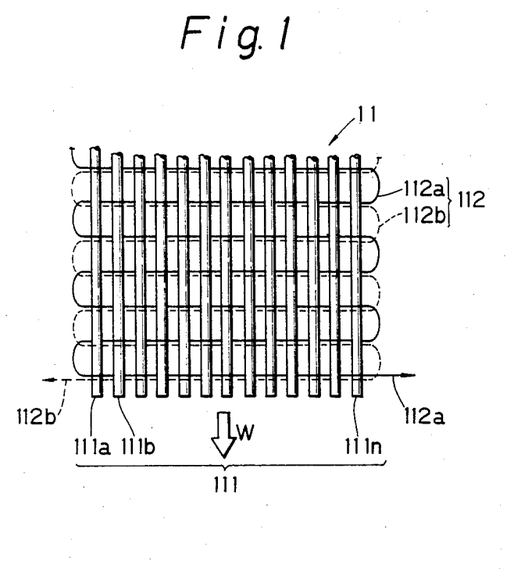
FIGS. 1 and 2 show the endless carrier formed of fabric, FIG. 1 being a plan view and FIG. 2 being a sectional side view.
Figure 2:
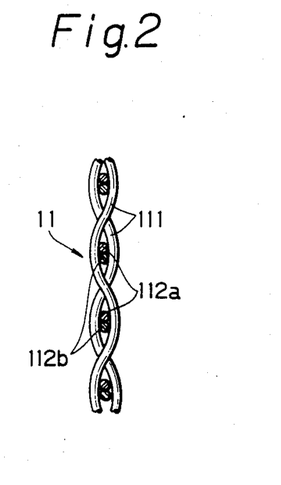

FIGS. 1 and 2 show the woven state of the endless carrier 11 formed of fabric, FIG. 1 being a plan view and FIG. 2 being a sectional side view The endless carrier 11 formed of fabric comprises a multiplicity of warps 111 disposed in the longitudinal direction of the endless carrier 11 and two wefts 112a and 112b disposed in the widthwise (lateral) direction. These warps 111 and wefts 112 are formed of filaments made of polyamide fibers of aromatic series. Additionally, since the number of warps is large, reference numeral 111 is used when the warps are generally referred to, and 111a, 111b... 111n are used when specific warps are referred to. Similarly, as for the wefts, reference numeral 112 is used when the wefts are generally referred to, and 112a and 112b are used when specific wefts are referred to.

As well known, polyamide fibers of aromatic series (Aramide) used as the warps 111 and the wefts 112 are synthetic fibers obtainable from polyamide having a structure of aromatic ring in the backbone structure, have such characteristic features that the melting point and modulus are high, the high-temperature characteristics is satisfactory and so forth, and are on the market under the trade names of Kevler and Nomex for example (both of which are manufactured by du Pont, Inc., U.S.A.).

By using the above-described filaments as base yarns, the predetermined warps 111 and wefts 112 are finished and woven into the endless carrier 11. Particularly, in order to effectively materialize as the performance of a straight-lined gradient the physical properties close to the high elongation curve idealized in the endless carrier 11, namely, the relationship between the tensile strength and the extensibility, it is important to minimize the crimp percentage $(=(L_2-L_1)\times 100/L_1$; where $L_1$ is a length of the endless carrier 11 thief-sampled and $L_2$ is a length of the warp 11 when the endless carrier 11 having a length $L_1$) of the base yarn in the longitudinal direction. For this, it is necessary that a value $p$ indicated by the following equation, which shows the denier balance between the base yarns of the warp 111 and the weft 112, can be preferably brought into a range from 2.4 to 3.0.

$$p = (Da \times Ma)/(Db \times Nb)$$

where
Da: the total denier of the warps 111,
Db: the total denier of the wefts 112,
Ma: the number of warps 111 constituting the endless carrier, and
Na: the thread count of the wefts 112 per inch (2.54 cm).

Furthermore, from the viewpoint of improving the performance of the surface wear resistance of the endless carrier 11, in the warp 111 particularly, it is recommended that a single warp base yarn is twisted in a direction S, and subsequently, three of these twisted warp base yarns are triply twisted in a direction Z, whereby a triple ply yarn thus obtained is used. The numbers of twists of the warps at the times of the single yarn twisting and triple yarn twisting give influences to the performance of the endless carrier 11, and particularly, it is preferable that the single yarn twisting and the triple yarn twisting are carried out such that the twist coefficient indicated by the following equation comes into a range from 70 to 90.

$$\text{The twist coefficient} = T/\sqrt{9000/D}$$

where
T: the number of twists per meter, and
D: the total denier of yarns obtained by twisting.

The endless carrier 11 constituted by the above-described warps 111 and wefts 112 is woven such that the structure shown in FIGS. 1 and 2 is obtained. More specifically, the two wefts 112a and 112b are inserted into the warps 111a, 111b . . . 111n, which have been subjected to the warping in a predetermined manner, simultaneously, separately of each other, from opposite selvedges, in opposed relationship to each other, and pulled and tightened by pulling in the inserting directions, respectively. At the same time, the endless carrier 11 is woven such that the respective wefts 112a and 112b can change in the inserting directions with each other as the endless carrier 11 moves along the woving direction W, thereby obtaining the stabilized width and thickness of the endless carrier 11.

With the endless carrier 11 being woven as described above, movements in the widthwise (lateral) direciton of the warps 111a, 111b . . . 111n disposed in the longitudinal direction can be reliably restrained and prevented by the wefts 112a and 112b. As the result, the endless carrier 11 can avoid being cracked in the longitudinal direction even if a high tensile load is applied to the endless carrier 11 during the power transmission, the endless carrier 11 is used for a long period of time and so forth. In other words, an occurrence of a slitting phenomenon can be prevented.

Since the endless carrier 11 is woven as described above, the elongation is controlled to a very low numerical value and the strength of the used warps 111 is efficiently utilized, the required strength of the endless carrier 11 can be obtained most economically. Then, with the above-described weave structure of the endless carrier 11, the tightening actions of the wefts 112a and 112b therebetween act as beatings in an ordinary loom, the weave structure of the warps 111a, 111b . . . 111n with the wefts 112a and 112b can be held in a closer condition. The higher the load acting to the endless carrier 11 is, the more actions applied are, so that notable effects can be displayed for improved tensile strength and decreased elongation of the endless carrier 11.

Furthermore, the weave structure of the above-described endless carrier 11 can offer such an outstanding advantage that the terminating ends of yarns which pose a problem in forming the endless carrier 11 into an endless shape, particularly, the terminating ends of the warps 111 can be effectively treated. Description will be given of the warps 111a and 111n, which are disposed at opposite sides in FIG. 8, as an example. The respective yarn terminating ends 111a and 111n of the warps 111a and 111n are inserted together with the two wefts 12a and 12b from one selvedge to the other, whereby these yarn terminating ends 111a' and 111n' are held closely when the load is applied to the endless carrier 11, so that the splitting phenomenon can be prevented from occurring. More specifically, such a phenomenon can be effectively avoided that, when the tensile load is applied to the endless carrier 11, slips of the warps 11 begin due to a premature breakage of the wefts 112 and the warps are broken off from one warp to another with the strength of the warps 111 not being fully displayed.

Additionally, it is preferable that the endless carrier 11 woven as described above is applied at one surface or both surfaces thereof with a rubber-like material or a thermoplastic resin material such as chlorosulfonated polyethylene rubber, fluororubber or fluoroplastics to a depth of covering stiches of the warps 111 and wefts 112. Additionally, in performing this covering, it is perferable to adopt such a technique that a well known pretreatment is effected to improve the adhesive force between the filaments as necessary.

Figures 8, 9A:
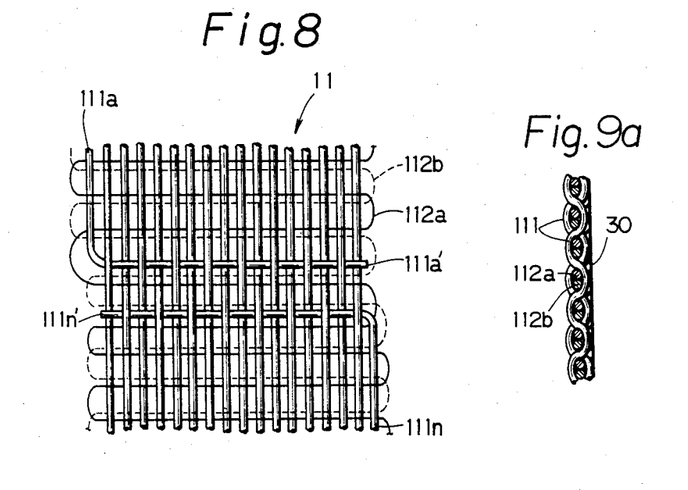
Figure 9B:
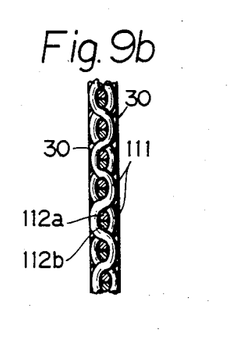

FIGS. 9 (a) and 9 (b) show the state where a layer 30 conststing of the rubber-like material or a thermoplastic resin material is formed on one or both surfaces of the endless carrier 11. FIG. 9 (a) shows the case where the layer 30 is formed on one of the surfaces, and FIG. 9 (b) shows the case where the layer 30 are formed on the both surfaces.

The surface or surfaces of the endless carrier 11 are covered by the rubber-like material or the thermoplastic resin material as described above, so that the filaments can be prevented from deteriorating due to the presence of oil, moisture and the like, thus improving the durability of the endless carrier 11.

Furthermore, when the filaments are disposed only in the longitudinal direction and covered with the rubber-like material as in the prior art, such a problem may be raised that the filaments are displaced during the heating process at the time of the covering, whereby a turbulance may occur in a circular pitch line, thus resulting in a distortion in the endless carrier 11. However, in the case of this embodiment as described above, even when the covering is effected by use of the rubber-like material or the thermoplastic resin material, the warps 111 disposed in the longitudinal direction are restrained in movement by the wefts 112, whereby no turbulence is caused to the circular pitch line, so that no distortion can occur in the endless carrier 11.

Additionally, the contents of the above-described endless carrier 11 are detailedly described in Japanese Patent Application Nos. 134923/1980 and 43339/1981 which have been previously filed by the present applicant. The present invention features that the endless belt for the power transmission of the type shown in FIGS. 4 to 7 is formed by use of the endless carrier 11 of the type previously filed.

Figure 10:
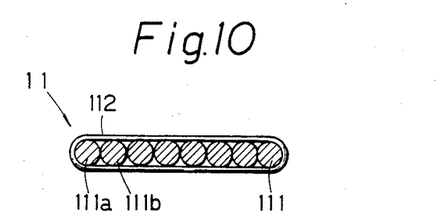
FIGS. 10 and 11 show another embodiment of the endless carrier, FIG. 10 being a sectional view and FIG. 11 being a plan view.
Figure 11:
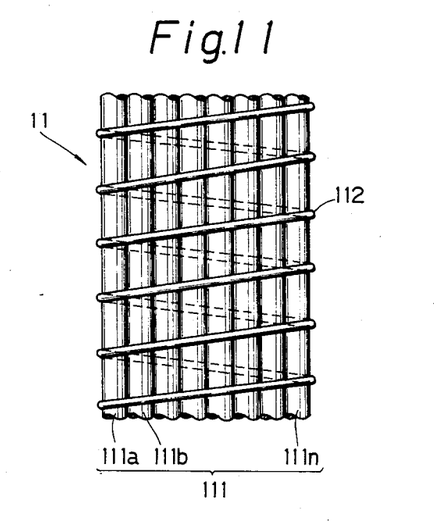

FIGS. 10 and 11 show another embodiment of the endless carrier 11, FIG. 10 being a sectional view and FIG. 11 being a plan view.

In this embodiment, one weft 112 is spirally wound around the warps 111a, 111b ... 111n. Even in this arrangement, the warps 111a, 111b ... 111n are restrained by the weft 112, so that the same function as in the preceding embodiment can be achieved.

Figures 12A, 12B:
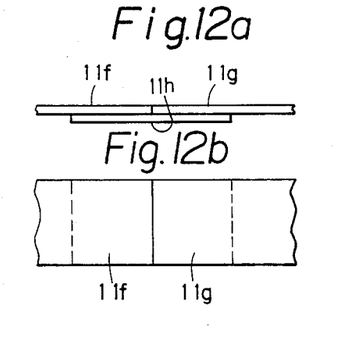
Figures 13A, 13B:
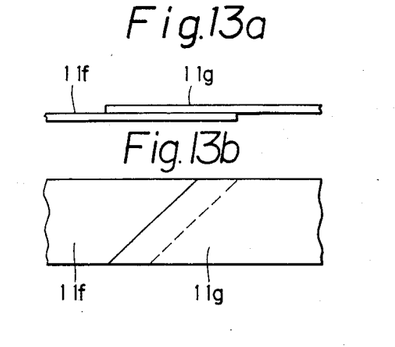

FIGS. 12 and 13 show other means for forming the endless carrier 11 into an endless shape. FIG. 12 shows the case where opposite ends 11f and 11g of the endless carrier 11 are joined by use of a patch member, i.e. the case of forming by a so-called pad method. FIG. 13 shows the case where the opposite ends 11f and 11g the endless carrier 11 are overlapped for joining, i.e. the case of forming by a so-called overlap method.

What is claimed is:

1. An endless belt for the power transmission, comprising a plurality of block bodies each including a body member formed of a highly rigid material and provided at opposite side portions thereof with inclined surfaces in frictional engagement with pulleys, and a clamp member formed separately of said body member, said plurality of block bodies being arranged in a row and adjacent to one another on a belt-shaped endless carrier formed of fabric in such a manner that said endless carrier is clamped between said body member and said clamp members, said belt-shaped endless carrier formed of fabric being woven by warps disposed in the longitudinal direction and wefts disposed in the widthwise direction, with said wefts restraining said warps, wherein the clamp member is constituted by a bar and a plate, the plate is bent doubly, the bar is clamped between the double bent portions, and the bar and the plate are integrally connected to each other;

the body member has a block posts erected from opposite sides thereof, block post insertion holes are formed in the plate at opposite sides of the bar in the clamp member, and the block posts are inserted into the block post insertion holes; and the opposite side portions of the plate are subjected to stakings in a state where the endless carrier is clamped between the body member and the clamp member.

2. An endless belt for the power transmission as set forth in claim 1, wherein one weft is spirally wound around the warps.

3. An endless belt for the power transmission as set forth in claim 1, wherein the body member is formed at the central portion thereof with a clamp recess for receiving the endless carrier and at opposite side portions thereof with said inclined surfaces being in frictional engagement with the circumferential groove of the pulley.

4. An endless belt for the power transmission as set forth in claim 2, wherein the body member is formed at the central portion thereof with a clamp recess for receiving the endless carrier and at opposite side portions thereof with said inclined surfaces being in frictional engagement with the circumferential groove of the pulley.

5. An endless belt for the power transmission as set forth in claim 1, wherein the undersurfaces on opposite sides of the front surface of the plate are slightly lower than the undersurface of the bar clamping the endless carrier under pressure, and, in the assembled state the undersurfaces are at the substantially same position as a center line of the endless carrier in the thicknesswise direction thereof.

6. An endless belt for the power transmission as set forth in claim 5, wherein a contact surface portion of the block body is formed such that it comes into contact with rear surfaces of the plate of another block body, to which the front surface of the plate is adjacent, and the body member, the inner end of the contact surface portion is formed by the undersurface of the plate and a gap corresponding to the plate thickness of the plate is provided in the block body and inwardly of the endless carrier, whereby, when the endless belt for the power transmission moves, being guided around the pulleys, the block bodies move, being rockingly rotated about the inner ends of the contact surface portion as being the fulcrums.

* * * * *